United States Patent [19]

Ito et al.

[11] Patent Number: 5,103,950
[45] Date of Patent: Apr. 14, 1992

[54] CYLINDRICAL ROLLER TYPE TWO-WAY CLUTCH

[75] Inventors: Jyoji Ito, Yokohama; Masao Shoji, Fujisawa, both of Japan

[73] Assignee: NSK-Warner K.K., Tokyo, Japan

[21] Appl. No.: 660,841

[22] Filed: Feb. 26, 1991

[30] Foreign Application Priority Data

Mar. 1, 1990 [JP] Japan .................... 2-47292

[51] Int. Cl.$^5$ .............................. F16D 3/34
[52] U.S. Cl. .................... 192/35; 192/43.2; 192/44; 192/48.1; 180/248
[58] Field of Search ............ 192/35, 44, 43, 43.2, 192/48.1; 180/247, 248

[56] References Cited

U.S. PATENT DOCUMENTS

| | | | |
|---|---|---|---|
| 3,055,471 | 9/1962 | Warn et al. | 192/35 X |
| 3,788,435 | 1/1974 | Prueter | 192/35 |
| 4,076,108 | 2/1978 | Fogelberg | 192/35 |
| 4,083,419 | 4/1978 | Fogelberg | 192/44 X |
| 4,124,085 | 11/1978 | Fogelberg | 192/44 X |
| 4,132,297 | 1/1979 | Brown et al. | 192/44 X |
| 4,184,575 | 1/1980 | Fogelberg | 192/44 X |
| 4,185,723 | 1/1980 | Kabel | 192/44 X |
| 4,222,472 | 9/1980 | Telford | 192/44 X |
| 4,230,211 | 10/1980 | Goto et al. | 192/44 X |
| 4,296,848 | 10/1981 | Kagata et al. | 192/44 X |
| 4,361,216 | 11/1982 | Overbeek | 192/44 X |

FOREIGN PATENT DOCUMENTS 437891 11/1935 United Kingdom .................. 192/44

Primary Examiner—Dirk Wright
Assistant Examiner—Andrea Pitts
Attorney, Agent, or Firm—Shapiro and Shapiro

[57] ABSTRACT

In a two-way clutch comprising an outer race having a plurality of roller receiving portions each formed by a pair of bisymmetrical arch-shaped cam surfaces, rollers disposed in the roller receiving portions, and a cage having support portions for the rollers and disposed on the inner periphery side of the outer race, the cage has a portion extending in the direction of a rotary shaft and clutch shoe receiving portions radially provided on the extending portion, and clutch shoes slidably fitted in the clutch shoe receiving portions have a sliding surface displaced by a centrifugal force resulting from the rotation of the clutch and sliding relative to a member outside the clutch.

8 Claims, 8 Drawing Sheets

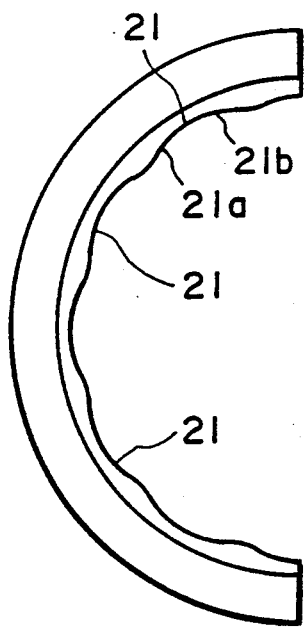 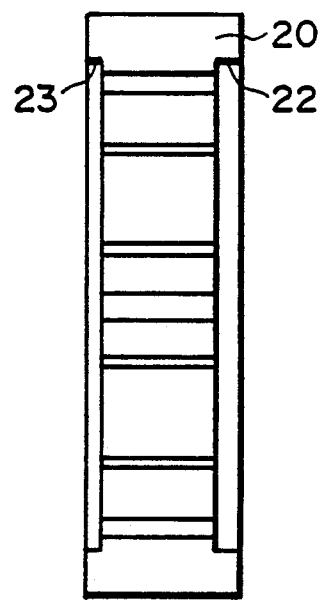 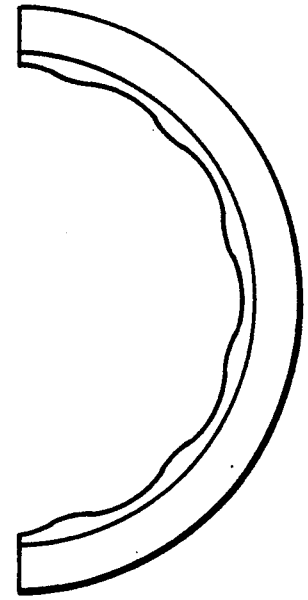
FIG. 3A   FIG. 3B   FIG. 3C
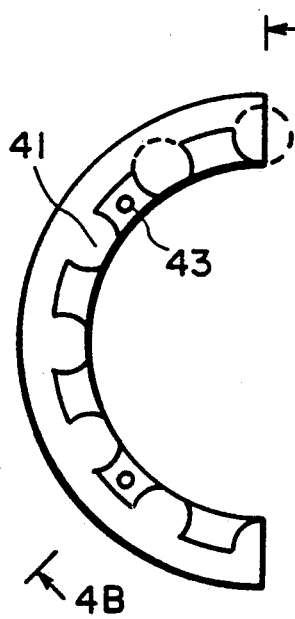 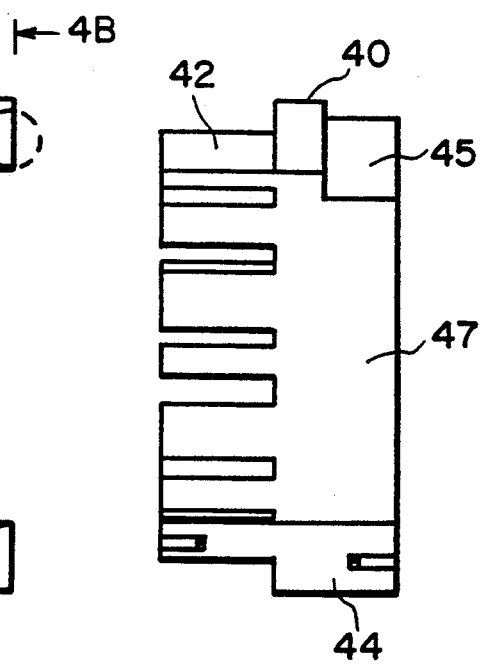 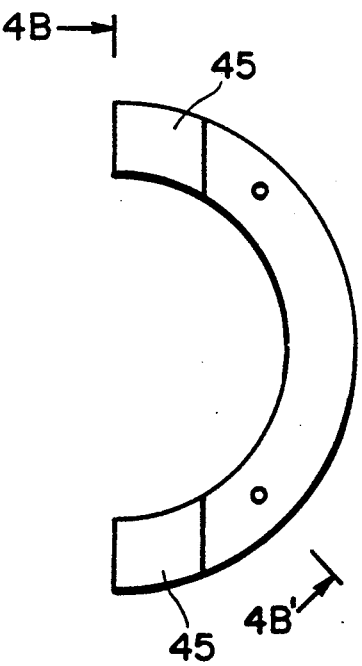
FIG. 4A   FIG. 4B   FIG. 4C

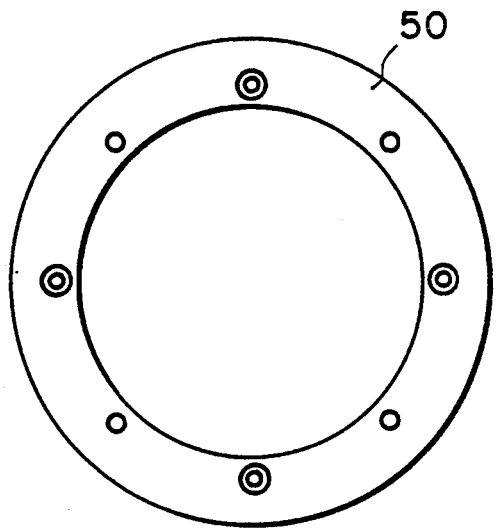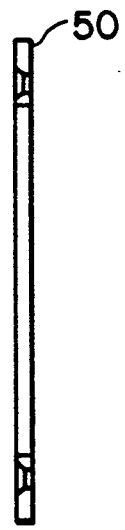
FIG. 5A   FIG. 5B
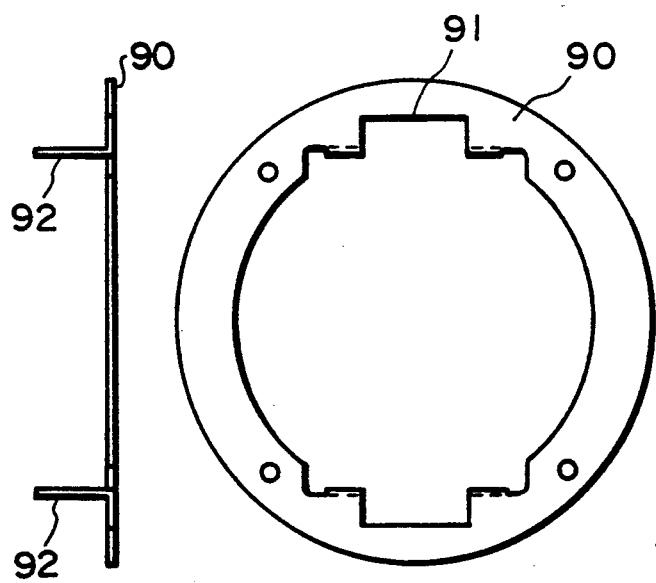
FIG. 6A   FIG. 6B

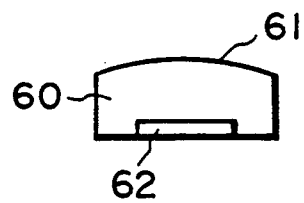
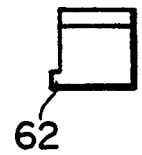
FIG. 7A    FIG. 7B
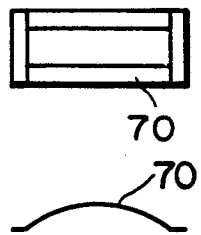
FIG. 8A
FIG. 8B
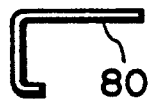
FIG. 10

CYLINDRICAL ROLLER TYPE TWO-WAY CLUTCH

BACKGROUND OF THE INVENTION

1. Field of the Invention

This invention relates to a two way clutch engageable and disengageable in forward and reverse directions.

2. Related Background Art

A one-way clutch is a mechanical part comprising a wedge member such as a cylindrical roller or a sprag provided between an inner race and an outer race rotatable coaxially with each other so as to transmit a torque only in one direction. A two-way clutch is endowed with the function of said one-way clutch in forward and reverse rotational directions. The two-way clutch is applied to the automatic changeover or the like of a four-wheel drive/two-wheel drive, and the principle thereof will hereinafter be described.

FIG. 1A and 1B of the accompanying drawings illustrates the changeover mechanism of four-wheel drive/two-wheel drive utilizing the two-way clutch. FIG. 1A shows the state of the two-way clutch when the engaged vehicle is moving forward. An outer race 20 is provided with a roller receiving portion 21 comprised of bisymmetrical arch-shaped cam surfaces 21a and 21b, and a cylindrical roller 30 which is a wedge member is inserted in the roller receiving portion 21 and between the cam surfaces and an inner race 10. The reference numeral 40 designates a cage for supporting the cylindrical roller 30. For purpose of the prsent description, it is to be understood that the vehicle is front-wheel-driven during two-wheel drive and the outer race 20 of the two-way clutch is connected to a power source, such as an engine generating a drive force, and the inner race 10 is connected to rear wheels which are driven (non-driving) wheels. When the vehicle is running by two wheel drive (i.e., front wheel drive), the outer race 20 of the clutch is connected to the power source such as the engine and rotates in the direction of arrow A, while the rear wheels freely rotate only by the frictional force thereof with the ground, which rotation is transmitted to the inner race 10, which is thus rotated in the same direction as the outer race (the direction of arrow A). Under normal conditions, the extraneous gear ratio or the like is suitably selected so that the rotational speed of the inner race may always be higher by several percent than the rotational speed of the outer race 20 which transmits the drive force. Since as described above, the rotation of the inner race is normally faster than the rotation of the outer race, the roller 30 is subjected to a frictional force in the leftward direction as viewed in the figure, and the cam surface 21b and the roller 30 are in their free state, so that the inner and outer races rotate freely relative to each other. When the front wheels which are the driving wheels slip for some reason, the running speed of the vehicle drops sharply and the rotational speed of the inner race 10 connected to the rear wheels which are the driven wheels begins to drop. When the slipping condition of the front wheels continues and the speeds of the inner and outer races become equal to each other, the roller 30 loses the a leftwardly acting frictional force created from the difference between the speeds of the inner and outer races and wedges between the cam surface 21b and the inner race 10, whereby the clutch becomes engaged. When such a state is brought about, the torque of the outer race 20 is transmitted to the inner race 10 and the drive force is also transmitted to the rear wheels, thus bringing about a four-wheel drive state. When in the four-wheel drive state, the vehicle gets out of its slipping condition with the aid of the drive force of the rear wheels, the vehicle begins to move normally again and the rotation of the rear wheels increases the number of rotations of the inner race of the clutch. When the rotational speed of the inner race exceeds the rotational speed of the outer race, the roller loses its wedge action again and the clutch becomes free, and the ordinary twowheel drive condition is restored.

FIG. 1B shows the engaged state of the aforedescribed clutch mechanism during the backward movement of the vehicle. The inner and outer races rotate in the direction of arrow B which is opposite to the rotational direction thereof during the forward movement of the vehicle. During the backward movement, as shown, the position of the cage 40 is shifted to left as viewed in the figure, and the roller 30 cooperates with the cam surface 21a to effect a wedge action. Since as described above, the rotational speed of the inner race of the clutch connected to the rear wheels of the vehicle normally higher than the rotational speed of the outer race, the clutch rotates freely during the normal running and the vehicle is driven by two-wheel drive. When the front wheels which are the driving wheels slip, the speed of the vehicle drops and therefore, the rotational speed of the rear wheels drops. When the speeds of the inner and outer races of the clutch become equal to each other, the roller 30 bites into the cam surface 21a due to its wedge action and the clutch becomes connected so that the drive force is also transmitted to the rear wheels and a four-wheel drive condition is temporarily brought about. When thereafter the front wheels get out of the slipping condition by the four-wheel drive, the rotational speed of the inner race increases again relative to the outer race. Thus, the clutch again becomes disconnected and the vehicle is restored to the ordinary two-wheel drive condition. The abovedescribed action of the clutch during the backward movement is, of course, the same as that during the forward movement.

To make the two-way clutch operable in the directions of forward and backward movements as described above, it is necessary that the cage holding the roller be shifted by a predetermined amount in the circumferential direction during the changeover of the direction of movement of the vehicle. This shifting operation has heretofore been usually manually effected and has been accomplished by the driver shifting the position of the cage as by the lever operation when changing over the direction of movement. There is also known a method of shifting the position of the cage by the utilization of an outside actuator such as hydraulic pressure, but this requires a special energy source, which in turn leads to disadvantages such as high cost and bulkiness of the apparatus.

SUMMARY OF THE INVENTION

It is an object of the present invention to automatic the shifting operation of a cage in a two-way clutch without requiring the above-described lever operation or a special power source such as hydraulic pressure.

In order to solve the above-noted problem, the present invention provides a two-way clutch comprising an outer race having a plurality of roller receiving portions each formed by a pair of bisymmetrical arch-shaped cam surfaces, rollers disposed in said roller receiving portions, and a cage having support portions for said rollers and disposed on the inner periphery side of said outer race, characterized in that said cage has a portion extending in the direction of a rotary shaft and clutch shoe receiving portions radially provided on said extending portion, and clutch shoes slidably fitted in said clutch shoe receiving portions have a sliding surface sliding relative to a member outside the clutch.

In the two-way clutch according to the present invention constructed as described above, the cage is always subjected to a force in the direction opposite to the rotational direction of the clutch by the clutch shoes, which are radially slidably provided on the cage and which slidably control an outside fixed member such as a clutch housing. Therefore, during the changeover of the forward and reverse rotations of the clutch, the cage shifts from its neutral position in a circumferential direction and is displaced so that the rollers and the cam surfaces corresponding to the rotational direction may suitably contact with each other.

BRIEF DESCRIPTION OF THE DRAWINGS

FIGS. 3A, 3B, and 3C are a partial left side view, a cross-sectional view and a partial right side view, respectively, of the outer race of the clutch.

FIGS. 4A, 4B and 4C are a partial left side view, a cross-sectional view and a partial right side view, respectively, of a cage, FIG. 4B being a composite view taken along lines 4B—4B of FIG. 4A and 4B—4B' of FIG. 4C.

FIGS. 5A and 5B are a left side view and a cross-sectional view, respectively, of a side plate.

FIGS. 6A and 6B are a cross-sectional view and a right side view, respectively, of a guide plate.

FIGS. 7A and 7B are a front view and a side view, respectively, of a clutch shoe.

FIGS. 8A and 8B are a top plan view and a front view, respectively, of a leaf spring.

FIG. 10 is a front view of a cage biasing spring.

DESCRIPTION OF THE PREFERRED EMBODIMENTS

Some preferred embodiments of the present invention will hereinafter be described with reference to the accompanying drawings.

Figure 2A:
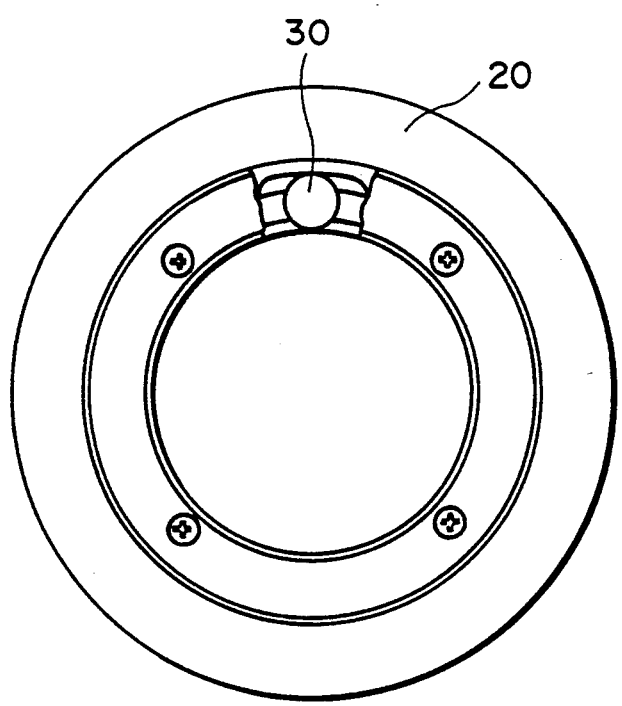
FIGS. 2A, 2B and 2C are a left side view, a cross-sectional view and a right side view, respectively, of a first embodiment of a two-way clutch according to the present invention, the cross-sectional view of FIg. 2B being taken along line 2B—2B of FIG. 2C.
Figures 2B, 2C:
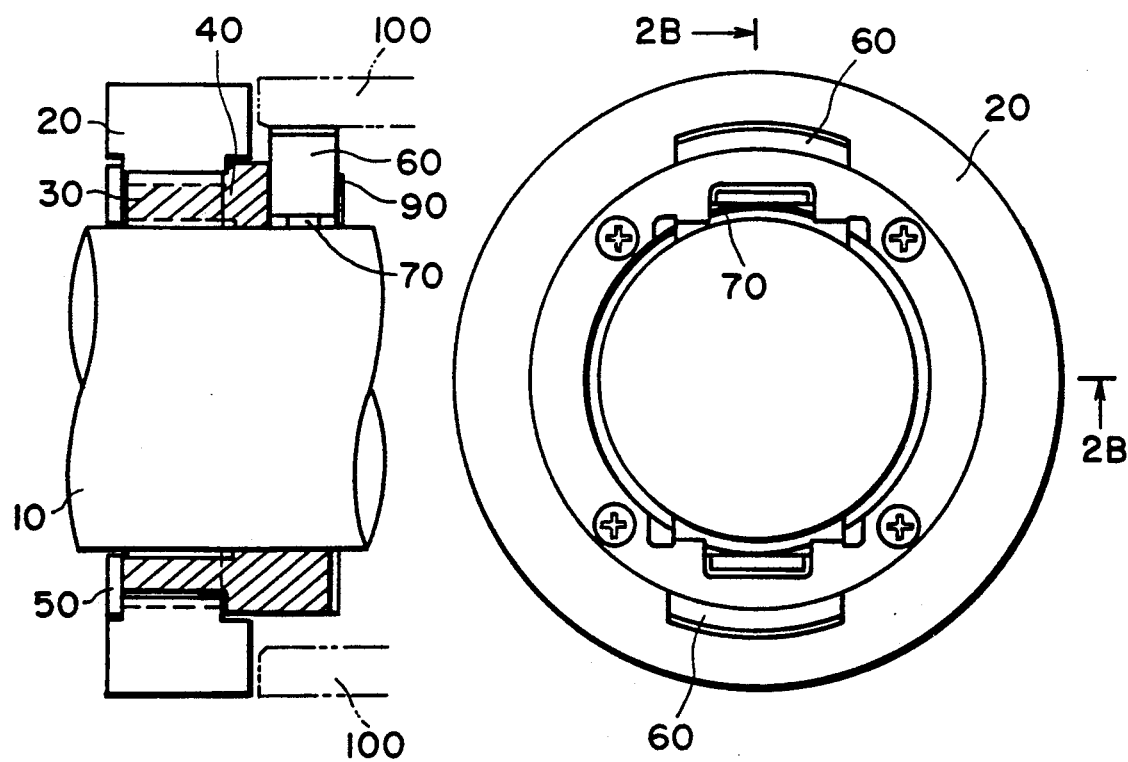

Referring initially to the clutch of FIGS. 2A-2C the reference numeral 10 designates a rotary shaft acting as the inner race of the clutch. The rotary shaft 10 is connected to the rear (non-driving) wheels of a vehicle through gears, etc. The reference numeral 20 denotes the outer race of the clutch, to which is transmitted the output torque of an engine or the like In some cases, a gear, a spline or the like is provided on the outer periphery of the outer race for power transmission. The reference numeral 30 designates cylindrical rollers as wedge elements. The rollers 30 are held by a cage 40 and fitted between the inner race and the outer race.

The functions of the respective constituents will hereinafter be described with reference to FIGS. 3 et seq.

FIGS. 3A-3C show the construction of the outer race of the clutch. A plurality of roller receiving portions 21 (twelve in the form shown) are formed on the inner peripheral surface of the outer race 20, and each of these roller receiving portions has bisymmetrical cam surfaces 21a and 21b. The connection of the clutch is effected by the wedge action between these cam surfaces 21a, 21b and the rollers 30.

FIGS. 4A-4C shows the cage 40. The cage 40 is incorporated between the inner race 10 and the outer race 20, and is provided with the same number of holding portions 41 for holding the rollers as there are rollers. The holding portions 41 are formed by cutting away the axially extending portion 42 of the cage 40 at equal intervals in the circumferential direction thereof. The cage 40 is combined with the outer race 20 through the rollers 30 and rotates with the outer race. The cage 40 is inserted into the outer race 20 from the right side as viewed in FIG. 2B, and is urged against a cut-away portion 22 provided in the right end portion of the outer race 20 on the inner diameter side. In the figure, four screw holes 43 are formed in the left end portion of the cage 40, and a side plate 50 (FIGS. 5A and 5B) put on from the left side of the outer race 20 is screwed to said screw holes, whereby it is fixed to the outer race. Thus, the cage 40 is axially integrally fixed to the outer race 20, but is circumferentially rotatable by an amount by which each roller is movable between the cam surfaces 21a and 21b on the opposite sides of the roller. The cage 40 further has an enlarged diameter portion 44 in the axially rightward direction as viewed in the figure, and this enlarged diameter portion 44 has two cut-away grooves 45 of a predetermined width in the diametrically opposite end portions thereof. Said cut-away grooves receive therein clutch shoes 60, which will be described later, for sliding movement in the radial direction of the clutch.

The clutch shoes 60 are of such a shape as shown in FIG. 7. Eac shoe has an arch-shaped outer peripheral portion 61 thereof always in frictional contact with the inner peripheral portion of a fixing member 100 indicated by a broken line in FIG. 2B. Accordingly, the outer peripheral portion 61 should desirably be formed of a material which is high in frictional force and resistant to generated heat. The fixing member 100 may be provided by molding a fixed frame independent of the clutch mechanism, for example, a portion of the clutch housing or the like. However, it need not be fixed and may be a rotatable member rotatable always at a lower speed than the outer race of the clutch. The clutch shoes 60 are inserted into the grooves 45, whereafter the cage assembly is incorporated as a unit with the clutch by a guide plate shown in FIGS. 6A and 6B being fixed to the right side of the cage from the right side as viewed in the FIG. 2B. At this time, a protruded portion 62 provided on the lower end of each clutch shoe comes into engagement with a shoe engaging portion 91 of the guide plate 90, whereby radial slipping-off of the shoes is prevented. When the rotational speed is high, the centrifugal force to the rollers acts strongly and the rollers 30 tend to be displaced radially outwardly and to lose their wedge action. However, in the illustrative embodiment, the frictional force between the shoes 60 and the outside member 100 becomes great and thus urges the cage 40 and the rollers 30 to the left or right more strongly so that the wedge action is maintained. In the present embodiment, the number of shoes is two, but for any particular application it may be suitably determined by design conditions.

FIGS. 8A and 8B show a leaf spring 70 which is of a shape in which the central portion of a rectangular leaf spring member is protrudingly curved. This leaf spring is mounted between a spring seat 92 (provided by bending and protruding a portion of the guide plate 90) and the clutch shoes 60, and normally imparts a radially outward biasing force to the clutch shoes 60. This leaf spring is provided to impart a biasing force to the shoes in order to ensure that the cage is to be displaced even when the centrifugal force applied to the shoes during starting or during low-speed rotation is small, but it may be eliminated depending on the operation conditions of the clutch.

Figure 1A:
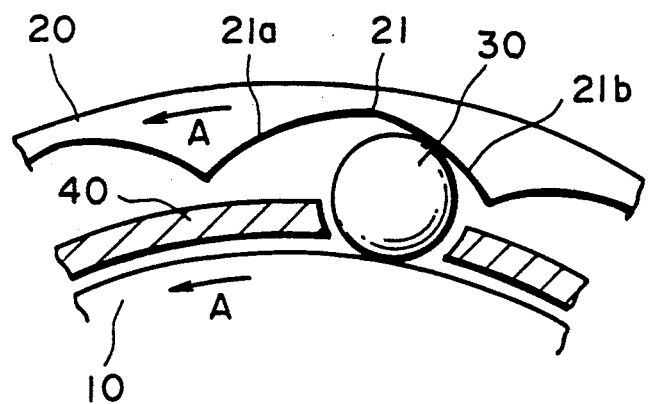
FIGS. 1A and 1B illustrate operative states of a two-way clutch.
Figure 1B:
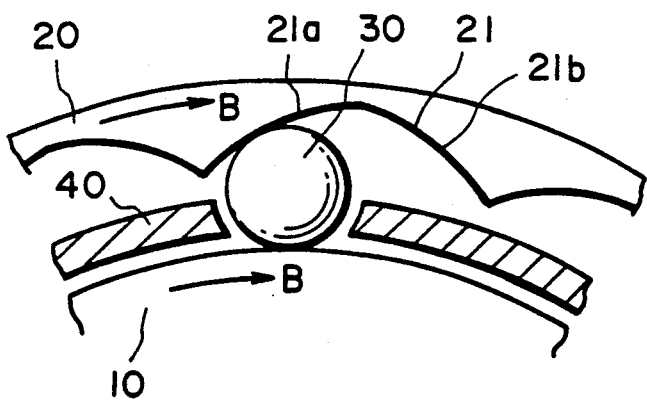

In the two-way clutch constructed as described above, when the vehicle is started in the forward direction, the number of rotations of the outer race 20 and of the cage 40 rotating therewith increases with an increase in the number of revolutions of the engine. At this time, the clutch shoes 60 slide, under the influence of centrifugal force, relative to the fixing member 100 provided on a portion of a fixed member such as a clutch box, and by the resulting frictional force, a rotative force in the direction opposite to the rotational direction of the clutch is imparted to the cage. This rotative force in the opposite direction rotates the cage in the direction opposite to the rotational direction of the clutch, and the rollers 30 come into contact with the cam surfaces 21b, thereby brining about the operative state of the clutch as shown in FIG. 1A. As long as the vehicle moves forward under normal running conditions, the inner race 10, which is connected to the rear wheels of the vehicle by gears or the like, has a rotational speed determined by design so as to be higher by several percent than that of the outer race, so that a frictional force in the direction opposite to the direction of wedging acts on the rollers 30 and the clutch maintains its disconnected state. When as previously described, the front wheels which are the driving wheels slip for some reason or other such as a muddy spot in a road or the unevenness of a road, only the engine rotates and the speed of the vehicle drops. Therefore, only the outer race of the clutch rotates and the number of rotations of the inner race of the clutch connected to the rear wheels of the vehicle drops sharply. When the speed of the inner race of the clutch becomes lower than that of the outer race, the frictional force to the rollers 30 is lost and therefore, the rollers 30 bite into the cam surfaces 21b and the clutch is engaged. As a result, the inner race 10 of the clutch becomes integral with the outer race 20 and comes to rotate at a speed equal to the speed of the outer race, whereby the drive force is also imparted to the front wheels and a four-wheel drive condition is temporarily brought about. When by the four-wheel drive, the vehicle recovers from its slipping state and restores its speed, the number of rotations of the inner race of the clutch increases again and exceeds the number of rotations of the outer race. At this time, the clutch is again disengaged and the vehicle restores itself to the ordinary two-wheel drive condition. The foregoing is a description of the action of the clutch when the vehicle moves forward. When the vehicle moves backward, the rotational direction differs, but the operation is otherwise the same. That is, during the backward movement, the only difference is that the cage is shifted in the direction opposite to the direction during the forward movement, as shown in FIG. 1B.

Figure 9A:
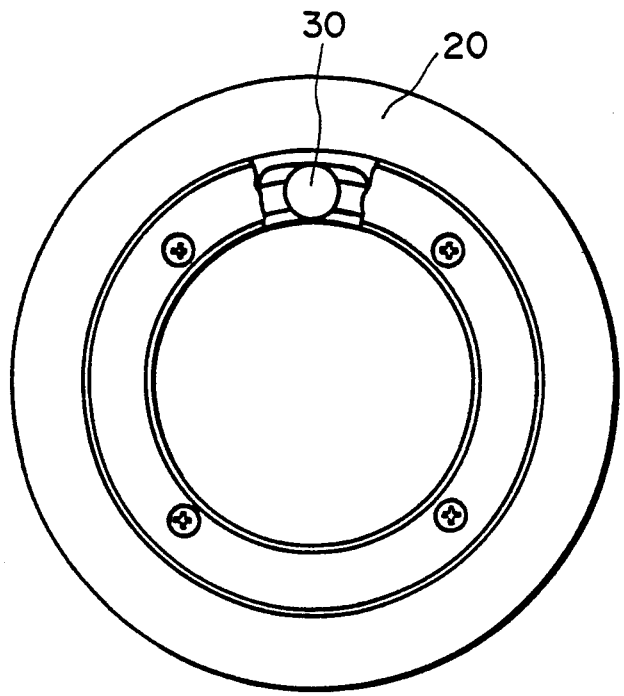
FIGS. 9A, 9B and 9C are a left side view, a cross-sectional view and a right side view, respectively, of a second embodiment of the present invention, the cross-sectional view of FIG. 9B being taken along line 9B—9B of FIG. 9C.
Figures 9B, 9C:
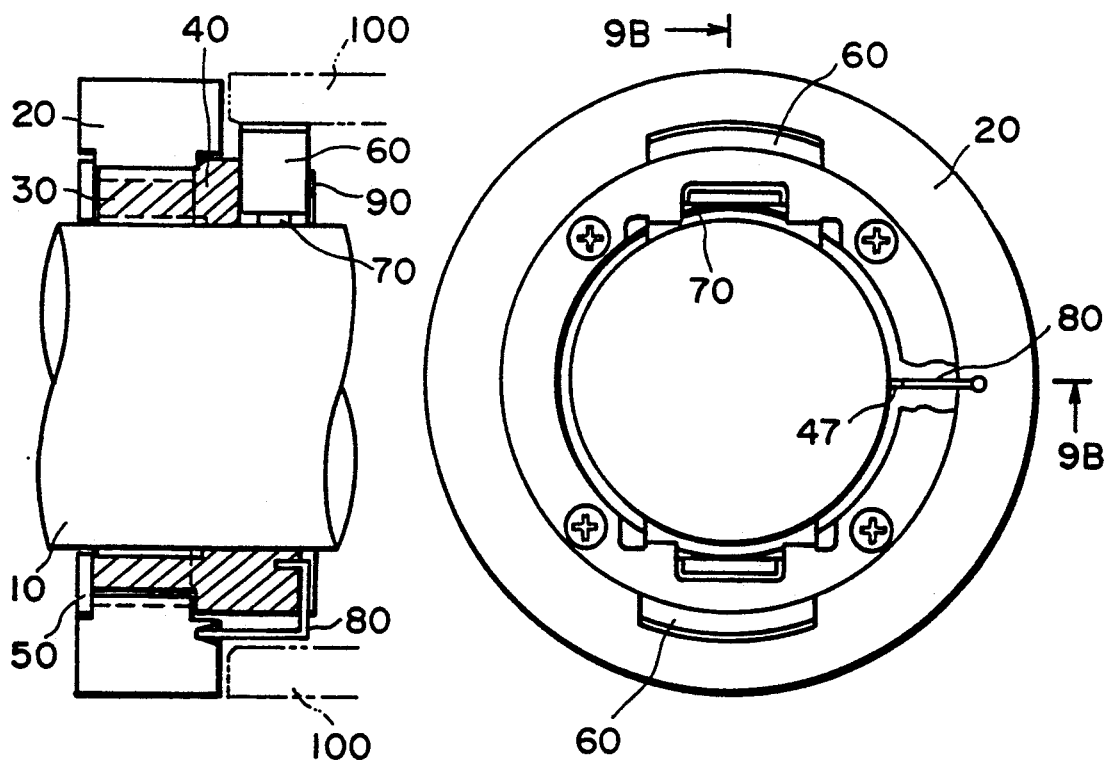
Figures 11A, 11B, 11C:
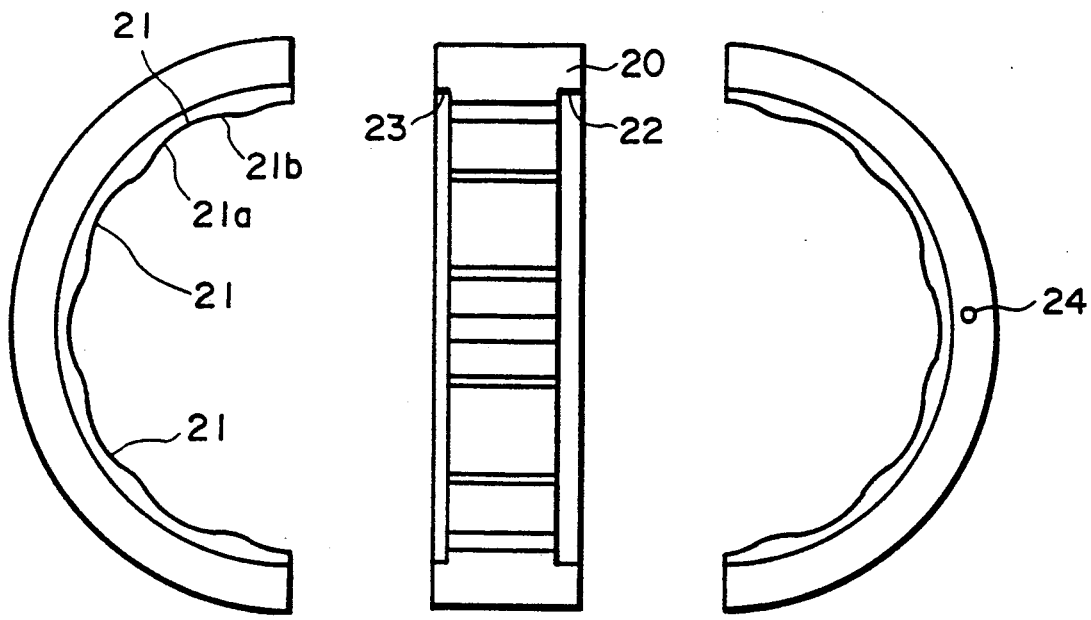
FIGS. 11A, 11B and 11C are a partial left side view, a cross-sectional view and a partial right side view, respectively, of an outer race in the second embodiment.
Figures 12A, 12B, 12C:
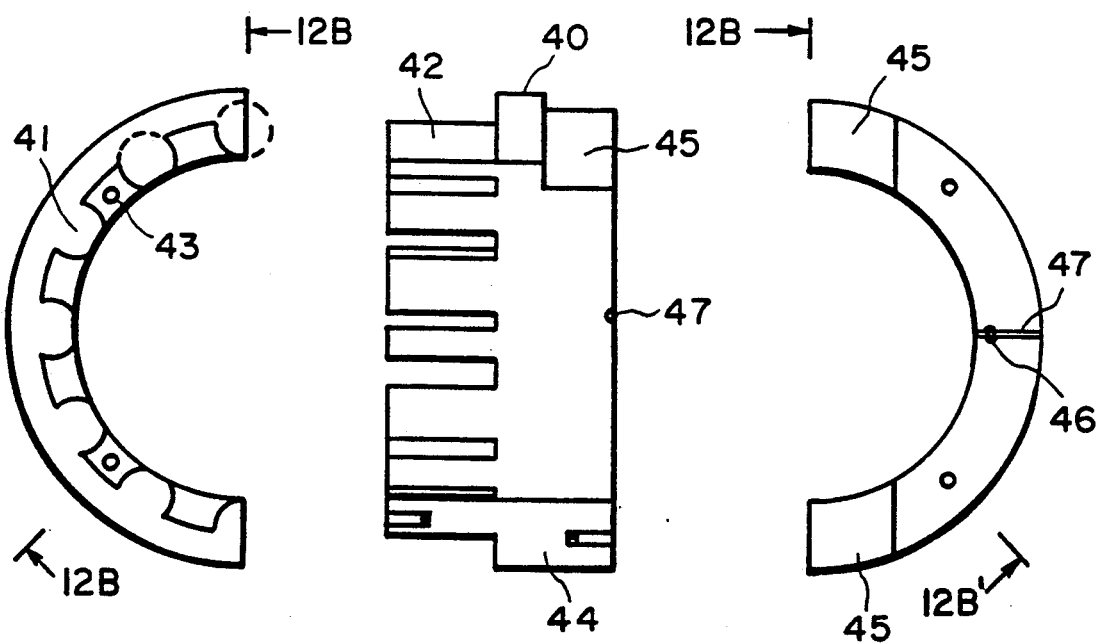
FIGS. 12A, 12B and 12C are a partial left side view, a cross-sectional view and a partial right side view of a cage used in the second embodiment, FIG. 12B being a composite view taken along lines 12B—12B of FIG. 12A and 12B—12B' of FIG. 12C.

FIGS. 9A-9C shows a second embodiment of the two-way clutch according to the present invention. The difference of this embodiment from that of FIGS. 2A-2C is that provision is made of a cage biasing spring 80 for imparting a biasing force to the cage in such a direction that the rollers 30 are always in their neutral state in the roller receiving portions 21 (the rollers are not contact with any of the cam surfaces). FIG. 10 shows the cage biasing spring 80, which is shown as a torsion spring provided by bending a bar-like spring member. This torsion spring 80 is inserted in a hole 24 (FIG. 11C) formed in the outer race and a hole 46 (FIG. 12C) formed in the cage 40. Also, a groove 47 is formed in the right side of the cage 40, as shown in FIGS. 12B and 12C, and receives the cage biasing spring 80 therein to prevent the rotation of the spring 80. This torsion spring 80 connects the outer race 20 and the cage 40 together and imparts a biasing force to the cage 40 so that each roller 30 tends to be positioned centrally of the corresponding roller receiving portion 21.

The use of a cage biasing sprig as just described offers an advantage in terms of avoiding unnecessary engagement of the clutch when the vehicle is suddenly started from its stopped state or when the vehicle is suddenly accelerated from its normal running. In such operating conditions, the speed of the outer race may exceed that of the inner race and an unnecessary engaged state may be brought about if the speed of the vehicle does not follow the rapid acceleration of the outer race. For design conditions which may bring about such an unnecessary engaged state, it is desirable that by the cage biasing spring, a biasing force in the direction opposite to the rotational direction be applied to the cage to thereby absorb the speed difference between the inner and outer races which occurs suddenly. That is, the cage biasing spring 80 connects the outer race and the inner race together and imparts a biasing force to the cage 40 so that for example, during the stoppage of the vehicle, each roller 30 may not contact with any of the left and right cam surfaces in the roller receiving portion 21. Therefore, even when the vehicle is rapidly accelerated, the cage 40 does not move in the circumferential direction until a force which overcomes the biasing force of the cage biasing spring 80 is applied to the cage and thus, the unnecessary engaged state of the clutch during sudden acceleration can be avoided. Accordingly, the biasing force of the cage biasing spring 80 is set to such a strength that in the stopped state of the vehicle, the cage 40 is moved to the neutral position and such that during the changeover of the direction of movement of the vehicle, the movement of the cage by the frictional force of the clutch shoes 60 is ensured.

Figures 13A, 13B, 13C:
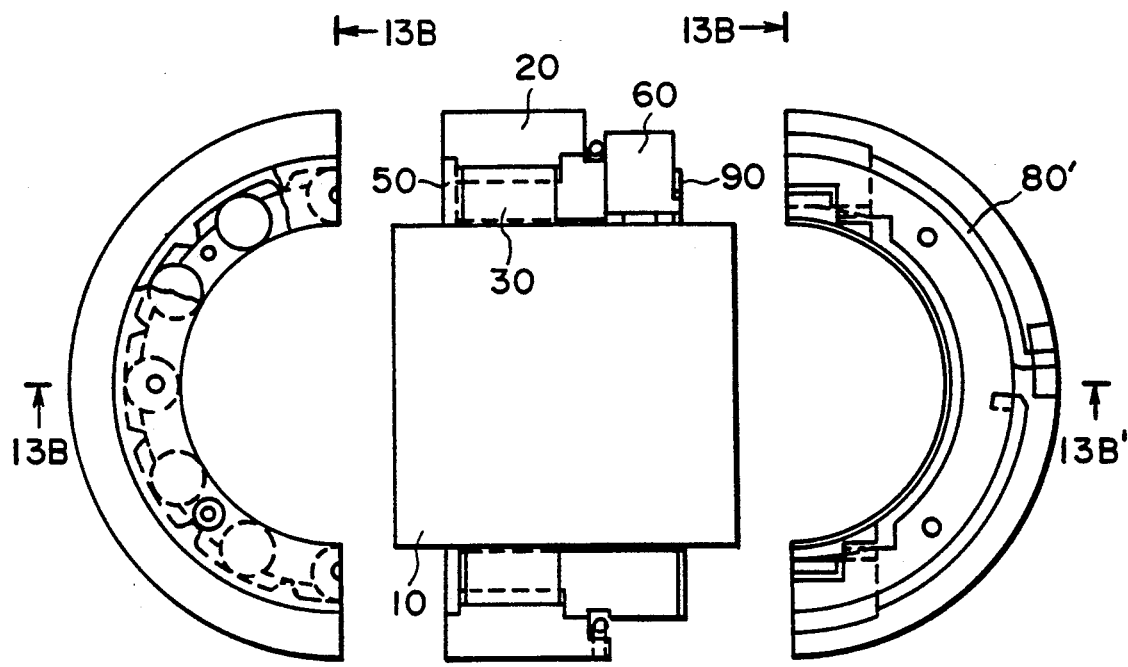
FIGS. 13A, 13B and 13C are a partial left side view, a cross-sectional view and a partial right view, respectively, of a third embodiment of the present invention, FIG. 13B being a composite view taken along lines 13B—13B of FIG. 13A and 13B—13B' of FIG. 13C.
Figure 14:
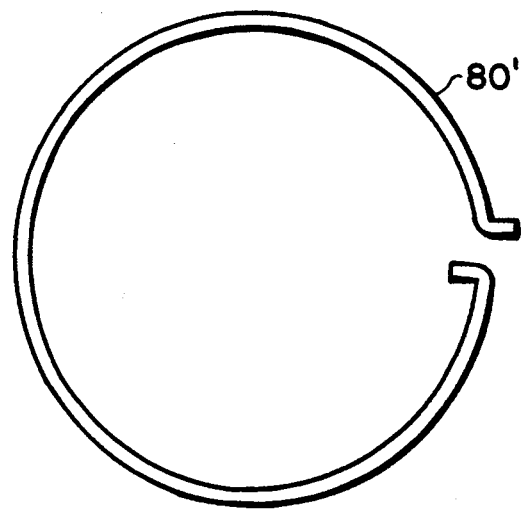
FIG. 14 is a front view of a ring spring.

FIGS. 13A-13C shows an embodiment using a modification of the cage biasing spring 80. In the case of this embodiment, the spring 80' is a ring spring (FIG. 14) formed by deforming a length of wire into a ring shape, and is fixed with its opposite ends inserted into holes formed in the outer race and the cage. Again in this case, the strength of the ring spring is set to such a strength that during the rest state of the clutch, the cage is held in its neutral position and such that during the changeover of the rotational direction, the frictional force between the clutch shoes and the outside fixing member exceeds the strength of the spring, whereby the cage can rotate so as to enable rollers 30 to contact with the appropriate cam surfaces.

As has hitherto been described, in the twoway clutch according to the present invention the clutch shoe members are radially protruded from the cage supporting the rollers which are wedge members, and the clutch shoes slide relative to a fixing member such as a gear case, whereby a circumferential frictional force is imparted to the cage and the cage is shifted in a predetermined direction by said frictional force until the rollers come to their position in which they contact with the cam surfaces. Thus, the two-way clutch according to the present invention does not require any special power source or a manual operation and can automatically effect the requried movement of the cage by only the frictional force. The invention is therefore quite advantageously applied for the changeover or the like of the driving wheels of a small vehicle.

What is claimed is:

1. A two-way clutch comprising an outer race having a plurality of roller receiving portions each formed with a bilateral pair of cam surfaces, rollers disposed in said roller receiving portions, and a cage having support portions for said rollers and disposed radially inwardly of said outer race, characterized in that said cage has a portion extending in a direction of a rotary shaft and clutch shoe receiving portions radially provided on said extending portion, and clutch shoes slidably fitted in said clutch shoe receiving portin have respective sliding surfaces radially displaced by centrifugal force resulting from rotation of the clutch and sliding relative to a member outside the clutch.

2. A two-way clutch according to claim 1, characterized in that a respective clutch shoe biasing spring is fitted in each said clutch shoe receiving portion and imparts a radially outward biasing force to the corresponding clutch shoe.

3. A two-way clutch comprising an outer race having a plurality of roller receiving portions each formed with a bilateral pair of cam surfaces, rollers disposed in said roller receiving portions, and a cage having support portions for said rollers and disposed radially inwardly of said outer race, characterized in that said cage has a portion extending in a direction of a rotary shaft and clutch shoe receiving portions radially provided on said extending portion, clutch shoes slidably fitted in said clutch shoe receiving portions have respective sliding surfaces radially displaced by centrifugal force resulting from rotation of the clutch and sliding relative to a member outside the clutch, a cage biasing spring connects said cage and said outer race together, and a biasing force of said cage biasing spring is set to a strength such that during a resting state of the clutch, said cage is urged so that said rollers tend to assume a neutral position in said roller receiving portions, and such that during rotation of the clutch, said cage is displaced when a frictional force applied to said clutch shoes overcomes said biasing force of said spring so that said rollers may assume a position in which each of them contacts one of the cam surfaces in accordance with a direction of the rotation.

4. A two-way clutch according to claim 1, characterized in that a respective shoe biasing spring is fitted in each clutch shoe receiving portion and imparts a radially outward biasing force to the corresponding clutch shoe.

5. A two-way clutch according to claim 3, characterized in that said cage biasing spring is a torsion spring constituted by a bent length of wire, said torsion spring being fixed with opposite ends of said length of wire inserted into holes formed in said outer race and said cage.

6. A two-way clutch according to claim 4, characterized in that said cage biasing spring is a torsion spring constituted by a bent length of wire, said torsion spring being fixed with opposite ends of said length of wire inserted into holes formed in said outer race and said cage.

7. A two-way clutch according to claim 3, characterized in that said cage biasing spring is a coil spring provided by a length of wire having a ring shape, said coil spring being fixed with opposite ends of said length of wire fixed to fixing portions provided on said outer race and said cage.

8. A two-way clutch according to claim 4, characterized in that said biasing spring is a coil spring provided by a length fo wire having a ring shape, said coil spring being fixed with opposite ends of said length of wire fixed to fixing portions provided on said outer race and said cage.

* * * * *